(12) United States Patent
Palmer et al.

(10) Patent No.: US 10,360,739 B2
(45) Date of Patent: *Jul. 23, 2019

(54) VEHICLE EVENT RECORDING SYSTEM AND METHOD

(71) Applicant: SmartDrive Systems, Inc., San Diego, CA (US)

(72) Inventors: Jason Palmer, Carlsbad, CA (US); Slaven Sljivar, San Diego, CA (US); Daniel A. Deninger, Carlsbad, CA (US); Alekh Vaidya, San Diego, CA (US); Jeffrey Griswold, San Diego, CA (US); Mark Freitas, San Diego, CA (US)

(73) Assignee: SmartDrive Systems, Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/620,420

(22) Filed: Jun. 12, 2017

(65) Prior Publication Data
US 2017/0278318 A1    Sep. 28, 2017

Related U.S. Application Data

(63) Continuation of application No. 14/676,622, filed on Apr. 1, 2015, now Pat. No. 9,679,420.

(51) Int. Cl.
*G07C 5/00* (2006.01)
*G07C 5/08* (2006.01)
(Continued)

(52) U.S. Cl.
CPC ............. *G07C 5/08* (2013.01); *B60R 16/023* (2013.01); *G07C 5/008* (2013.01); *G07C 5/0866* (2013.01); *H04N 7/18* (2013.01); *H04N 7/183* (2013.01)

(58) Field of Classification Search
USPC ........................................................ 701/29.1
See application file for complete search history.

(56) References Cited

U.S. PATENT DOCUMENTS

| | | | |
|---|---|---|---|
| 5,505,076 A | 4/1996 | Parkman | |
| 5,596,647 A * | 1/1997 | Wakai | H04H 20/62 |
| | | | 348/E7.049 |

(Continued)

FOREIGN PATENT DOCUMENTS

WO     2004066275     8/2004

OTHER PUBLICATIONS

World News Tonight, CBC Television New Program discussing teen drivers using the DriveCam Program and DriveCam Technology, Oct. 10, 2005, on PC formatted CD-R, World News Tonight.wmv, 7.02 MB, Created Jan. 12, 2011. (1 pg.).

(Continued)

*Primary Examiner* — Jean Paul Cass
(74) *Attorney, Agent, or Firm* — Esplin & Associates, PC

(57) ABSTRACT

This disclosure relates to a system configured to generate synchronized electronic vehicle event records. The synchronized vehicle event records may include vehicle operation information, video information, and/or other information. The synchronized electronic vehicle event records may be generated remotely (e.g., "in the cloud") from a vehicle. The system is configured to communicate with factory installed and/or other (e.g., third party) vehicle systems to generate the vehicle event information and/or cause other information relevant to a particular vehicle event to be transmitted in addition to the vehicle event information. By communicating with existing vehicle systems and causing these systems to transmit information related to vehicle events themselves, and generating the synchronized electronic vehicle event records remotely from a vehicle the system reduces the (Continued)

amount and/or cost of aftermarket equipment that must be installed in a vehicle for vehicle event monitoring.

16 Claims, 5 Drawing Sheets

(51) Int. Cl.
*H04N 7/18* (2006.01)
*B60R 16/023* (2006.01)

(56) References Cited

U.S. PATENT DOCUMENTS

| | | | |
|---|---|---|---|
| 6,317,682 B1 | 11/2001 | Ogura | |
| 6,526,352 B1 | 2/2003 | Breed | |
| 6,553,308 B1 | 4/2003 | Uhlmann | |
| 6,954,689 B2 | 10/2005 | Hanson | |
| 7,027,621 B1 | 4/2006 | Prokoski | |
| 7,548,586 B1* | 6/2009 | Mimar | G06T 1/20 |
| | | | 375/240.26 |
| 7,596,439 B2 | 9/2009 | Oesterling | |
| 7,868,912 B2* | 1/2011 | Venetianer | G06K 9/00369 |
| | | | 348/143 |
| 7,984,146 B2 | 7/2011 | Rozak | |
| 8,423,009 B2 | 4/2013 | Srinivasan | |
| 8,805,110 B2* | 8/2014 | Rhoads | G06K 9/00664 |
| | | | 382/255 |
| 9,610,955 B2 | 4/2017 | Palmer | |
| 9,715,711 B1* | 7/2017 | Konrardy | H04W 4/90 |
| 9,754,325 B1* | 9/2017 | Konrardy | H04W 4/90 |
| 9,767,516 B1* | 9/2017 | Konrardy | H04W 4/90 |
| 9,786,154 B1* | 10/2017 | Potter | G08B 21/02 |
| 9,792,656 B1* | 10/2017 | Konrardy | H04W 4/90 |
| 9,805,423 B1* | 10/2017 | Konrardy | H04W 4/90 |
| 9,805,601 B1* | 10/2017 | Fields | G08G 1/096791 |
| 9,858,621 B1* | 1/2018 | Konrardy | H04W 4/90 |
| 9,868,394 B1* | 1/2018 | Fields | G08G 1/096791 |
| 9,870,649 B1* | 1/2018 | Fields | G08G 1/096791 |
| 9,942,526 B2 | 4/2018 | Plante | |
| 2002/0156558 A1 | 10/2002 | Hanson | |
| 2003/0055666 A1 | 3/2003 | Roddy | |
| 2003/0081123 A1 | 5/2003 | Rupe | |
| 2003/0137194 A1 | 7/2003 | White | |
| 2003/0152145 A1* | 8/2003 | Kawakita | H04N 5/77 |
| | | | 375/240.12 |
| 2003/0201875 A1 | 10/2003 | Kuo | |
| 2004/0032493 A1 | 2/2004 | Franke | |
| 2004/0257208 A1 | 12/2004 | Huang | |
| 2005/0038581 A1 | 2/2005 | Kapolka | |
| 2005/0068417 A1 | 3/2005 | Kreiner | |
| 2005/0083404 A1 | 4/2005 | Pierce | |
| 2005/0152353 A1* | 7/2005 | Couturier | H04L 47/15 |
| | | | 370/389 |
| 2005/0171663 A1 | 8/2005 | Mittelsteadt | |
| 2005/0205719 A1 | 9/2005 | Hendrickson | |
| 2005/0243171 A1 | 11/2005 | Ross, Sr. | |
| 2006/0025907 A9 | 2/2006 | Kapolka | |
| 2006/0129578 A1* | 6/2006 | Kim | G06Q 30/00 |
| 2006/0143435 A1* | 6/2006 | Kwon | G06F 21/10 |
| | | | 713/150 |
| 2006/0158349 A1 | 7/2006 | Oesterling | |
| 2006/0259933 A1 | 11/2006 | Fishel | |
| 2007/0088488 A1 | 4/2007 | Reeves | |
| 2008/0195261 A1* | 8/2008 | Breed | B60R 21/0132 |
| | | | 701/2 |
| 2010/0054709 A1* | 3/2010 | Misawa | G06F 3/1454 |
| | | | 386/239 |
| 2010/0103165 A1* | 4/2010 | Lee | G06T 15/005 |
| | | | 345/419 |
| 2010/0149418 A1* | 6/2010 | Freed | H04N 5/20 |
| | | | 348/572 |
| 2010/0201875 A1* | 8/2010 | Rood | G09F 27/00 |
| | | | 348/552 |
| 2011/0169625 A1 | 7/2011 | James | |
| 2012/0065834 A1 | 3/2012 | Senart | |
| 2012/0330528 A1* | 12/2012 | Schwindt | G01S 13/52 |
| | | | 701/96 |
| 2013/0028320 A1* | 1/2013 | Gardner | H04N 21/2381 |
| | | | 375/240.12 |
| 2013/0046449 A1 | 2/2013 | Yuecel | |
| 2013/0052614 A1 | 2/2013 | Mollicone | |
| 2013/0151980 A1* | 6/2013 | Lee | G06F 16/954 |
| | | | 715/738 |
| 2013/0170762 A1* | 7/2013 | Marti | H04N 19/50 |
| | | | 382/232 |
| 2013/0189649 A1 | 7/2013 | Mannino | |
| 2013/0345929 A1* | 12/2013 | Bowden | B60R 1/00 |
| | | | 701/36 |
| 2014/0089504 A1* | 3/2014 | Scholz | H04L 41/5032 |
| | | | 709/224 |
| 2014/0232863 A1* | 8/2014 | Paliga | H04N 21/23109 |
| | | | 348/143 |
| 2014/0300739 A1* | 10/2014 | Mimar | H04N 7/188 |
| | | | 348/148 |
| 2015/0057512 A1* | 2/2015 | Kapoor | A61B 5/0205 |
| | | | 600/324 |
| 2015/0135240 A1* | 5/2015 | Shibuya | H04N 21/2347 |
| | | | 725/81 |
| 2015/0156174 A1* | 6/2015 | Fahey | H04L 63/0428 |
| | | | 713/168 |
| 2015/0170428 A1 | 6/2015 | Harter | |
| 2015/0189042 A1* | 7/2015 | Sun | H04W 76/14 |
| | | | 709/217 |
| 2015/0203116 A1 | 7/2015 | Fairgrieve | |
| 2015/0222449 A1* | 8/2015 | Salinger | H04L 12/2801 |
| | | | 370/419 |
| 2016/0182170 A1* | 6/2016 | Daoura | H04W 40/22 |
| | | | 455/3.01 |
| 2017/0301220 A1* | 10/2017 | Jarrell | H04W 4/70 |
| 2018/0025636 A1* | 1/2018 | Boykin | G11B 27/102 |
| | | | 701/1 |
| 2018/0033300 A1* | 2/2018 | Hansen | H04B 1/3822 |

OTHER PUBLICATIONS

Written Opinion issued in PCT/US07/68328 dated Oct. 15, 2007. (3 pgs.).
Written Opinion of the International Searching Authority for PCT/US2006/47042, dated Feb. 25, 2008 (5 pages).
Written Opinion of the International Searching Authority for PCT/US2006/47055, dated Mar. 20, 2008 (5 pages).
"DriveCam, Inc's Disclosure of Proposed Constructions and Extrinsic Evidence Pursuant to Patent L.R. 4.1.a & 4.1.b" Disclosure and Extrinsic Evidence in *DriveCam, Inc.* v. *SmartDrive Systems, Inc.*, Case No. 3:11-CV-00997-H-RBB, for the Southern District of California. Nov. 8, 2011, 68 pages.
"DriveCam Driving Feedback System", DriveCam brochure, Jun. 12, 2001, Document #6600128, 2 pages.
"DriveCam Driving Feedback System" DriveCam brochure, Mar. 15, 2004, 4 pages.
"DriveCam Passenger Transportation Module", DriveCam brochure, Oct. 26, 2001, 2 pages.
"DriveCam Video Event Data Recorder", DriveCam brochure, Nov. 6, 2002, Document #6600127, 2 pages.
"Responsive Claim Construction and Identification of Extrinsic Evidence of Defendant/Counterclaimant SmartDrive Systems, Inc." Claim Construction and and Extrinsic Evidence in *DriveCam, Inc.* v. *SmartDrive Systems, Inc.*, Case No. 3:11-CV-00997-H (RBB), for the Southern District of California. Nov. 15, 2011, 20 pages.
"Sonic MyDVD 4.0: Tutorial: Trimming video segments". Tutorial for software bundled with Adaptec VideoOh! DVD USB 2.0 Edition, 2003, 13 pages.
"User's Manual for DriveCam Video Systems' HindSight 20/20 Software Version 4.0" DriveCam Manual, San Diego, 2003, Document #6600141-1, 54 pages.
Canadian Office Action issued in Application No. 2,632,685 dated Jan. 30, 2015; 5 pages.

(56) References Cited

OTHER PUBLICATIONS

Dan Maher, "DriveCam Taking Risk Out of Driving", DriveCam brochure folder, Jun. 6, 2005, 6 pages.
David Maher, 'DriveCam Brochure Folder', Jun. 6, 2005 (2 pg.).
Del Lisk, "DriveCam Training Seminar" Handout, 2004, 16 pages.
European Examination Report issued in EP 07772812.9 dated Jan. 22, 2015; 5 pages.
Jean (DriveCam vendor) "DriveCam Driving Feedback System", DriveCam brochure, Nov. 6, 2002, Document #6600128-1, 2 pages.
Notice of Allowance Application for U.S. Appl. No. 11/566,424, dated Feb. 26, 2010, 6 pages.
Notice of Allowance for U.S. Appl. No. 11/377,164, dated Dec. 3, 2014, 5 pages.
Notice of Allowance for U.S. Appl. No. 11/377,164, dated Feb. 13, 2015, 2 pages.
Notice of Allowance for U.S. Appl. No. 11/377,164, dated Feb. 25, 2014, 2 pages.
Notice of Allowance for U.S. Appl. No. 11/377,164, dated Nov. 18, 2013, 7 pages.
Notice of Allowance for U.S. Appl. No. 11/377,167, dated Apr. 1, 2015, 7 pages.
Notice of Allowance for U.S. Appl. No. 11/800,876, dated Apr. 19, 2012, 8 pages.
Notice of Allowance for U.S. Appl. No. 13/957,810, dated Jun. 8, 2015, 10 pages.
USPTO Final Office Action for U.S. Appl. No. 11/296,906, dated Aug. 8, 2012, 15 pages.
USPTO Final Office Action for U.S. Appl. No. 12/096,591, dated Dec. 5, 2014, 23 pages.
USPTO Final Office Action for U.S. Appl. No. 12/096,591, dated Jul. 18, 2012, 15 pages.
USPTO Final Office Action for U.S. Appl. No. 12/096,591, dated Nov. 7, 2013, 14 pages.
USPTO Final Office Action for U.S. Appl. No. 13/957,810, dated Jun. 27, 2014, 22 pages.
USPTO Final Office Action for U.S. Appl. No. 14/036,299, dated Feb. 24, 2015, 9 pages.
USPTO Non-Final Office Action for U.S. Appl. No. 11/296,906, dated Apr. 8, 2014, 19 pages.
USPTO Non-Final Office Action for U.S. Appl. No. 11/296,906, dated Jun. 12, 2012, 13 pages.
USPTO Non-Final Office Action for U.S. Appl. No. 11/377,164, dated Apr. 7, 2014, 7 pages.
USPTO Non-Final Office Action for U.S. Appl. No. 11/377,164, dated Aug. 18, 2014, 5 pages.
USPTO Non-Final Office Action for U.S. Appl. No. 11/377,164, dated Sep. 10, 2012, 10 pages.
USPTO Non-Final Office Action for U.S. Appl. No. 11/377,167, dated Jun. 27, 2013, 11 pages.
USPTO Non-Final Office Action for U.S. Appl. No. 12/096,591, dated Jun. 14, 2011, 8 pages.
USPTO Non-Final Office Action for U.S. Appl. No. 12/096,591, dated Mar. 27, 2013, 16 pages.
USPTO Non-Final Office Action for U.S. Appl. No. 13/957,810, dated Apr. 17, 2015, 6 pages.
USPTO Non-final Office Action for U.S. Appl. No. 13/957,810, dated Nov. 27, 2013, 18 pages.
Inovate Motorsports, OT-1 16 Channel 0BD-II Interface User Manual, Version 1.0, Nov. 28, 2007, pp. 3, 4, 21 and 27.
PCT International Search Report and Written Opinion for PCT/US15/60721 dated Feb. 26, 2016, 11 pages.
Trivinci Systems, LLC, "Race-Keeper System User Guide", V1 .1.02, Jan. 2011, p. 21.
USPTO Non-Final Office Action dated Jan. 4, 2016 in U.S. Appl. No. 14/529,134, filed Oct. 30, 2014 (65 pgs).
PCT International Search Report and Written Opinion for PCT/IB16/51863, dated Sep. 16, 2016 (18 pgs.).
PCT International Search Report and Written Opinion for PCT/US2016/012757 dated Mar. 18, 2016 (11 pgs.).
Edwin Olson, A Passive Solution to the Sensor Synchronization Problem, the 2010 IEEE/RSJ International Conference on Intelligent Robots and Systems, Oct. 18-22, 2010, 6 pages.
Olson, E, A passive solution to the sensor synchronization problem, Intelligent Robots and Systems (IROS), Technical Fields 2010 IEEE/RSJ International Conference on, IEEE, Piscataway, NJ, USA, Searched (IPC) Oct. 18, 2010 (Oct. 18, 2010), pp. 1059-1064, XP031920438, DOI: 10.1109/Iros.2010.5650579 ISBN: 978-1-4244-6674-0.

\* cited by examiner

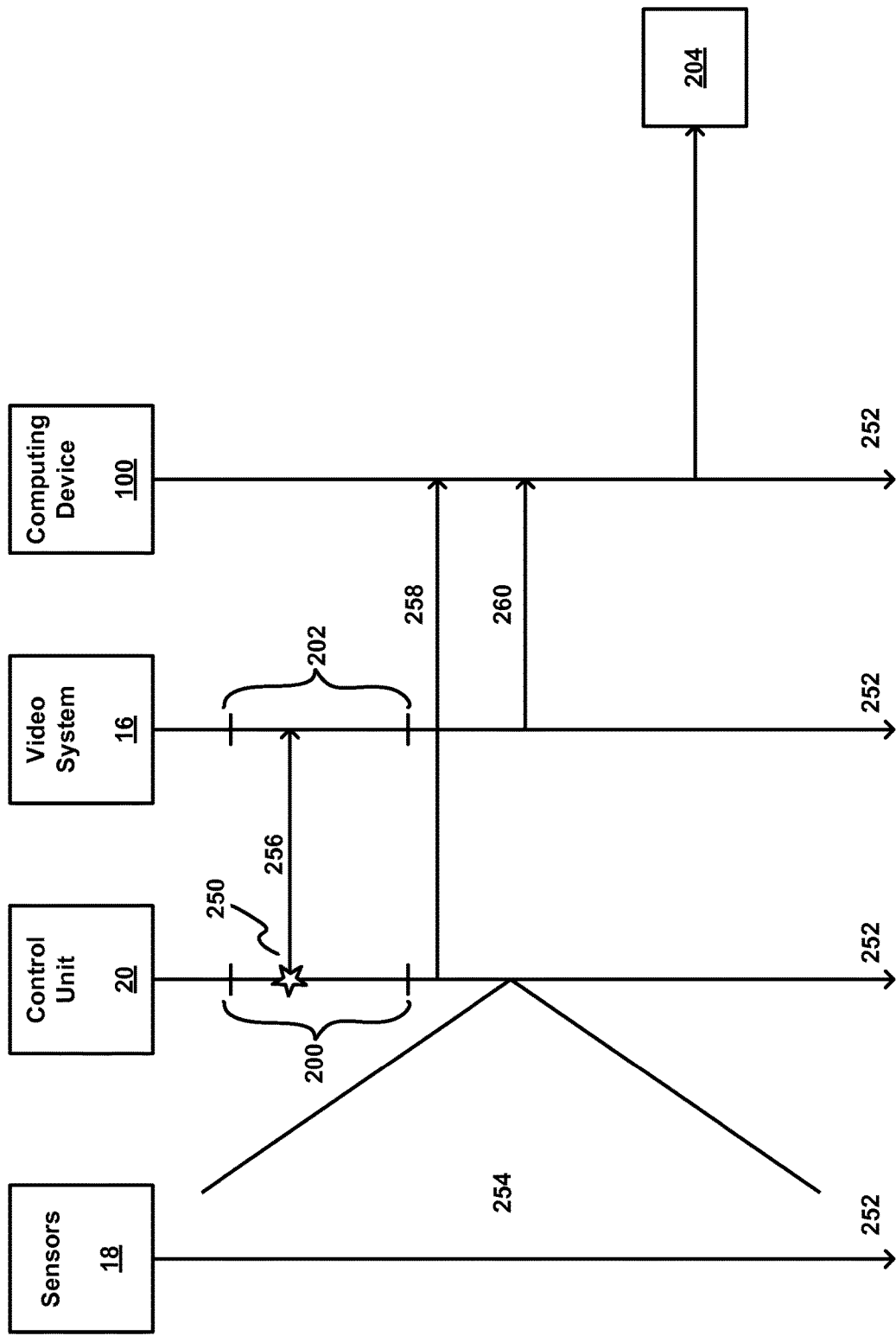

VEHICLE EVENT RECORDING SYSTEM AND METHOD

FIELD

This disclosure relates to a system configured to generate a synchronized electronic vehicle event record.

BACKGROUND

Systems configured to record, store, and transmit video, audio, and sensor data associated with a vehicle responsive to an accident involving the vehicle are known. Typically, such systems include an aftermarket video camera as an integral part of the system and detect an accident based on data from sensors such as an accelerometer mounted on the vehicle. Vehicle data and video from an accident are generated and stored locally on a device coupled with the vehicle as a single electronic file associated with the accident.

SUMMARY

One aspect of this disclosure relates to a system configured to generate synchronized electronic vehicle event records. The synchronized electronic vehicle event records may correspond to vehicle events involving a vehicle. The synchronized vehicle event records may include vehicle operation information, video information, and/or other information. The synchronized electronic vehicle event records may be generated remotely (e.g., "in the cloud") from the vehicle by one or more computing devices. The system may include a control unit coupled with the vehicle configured to detect the vehicle events and transmit vehicle event information that includes vehicle operation information that corresponds to detected vehicle events. The control unit may be configured to communicate with factory installed and/or other (e.g., third party) external vehicle systems to generate the vehicle event information and/or cause other information relevant to a particular vehicle event to be transmitted in addition to the vehicle event information. By communicating with existing vehicle systems and causing these systems to transmit information related to vehicle events themselves, and generating the synchronized electronic vehicle event records remotely from the vehicle, the system reduces the amount and/or cost of aftermarket equipment that must be installed in the vehicle for vehicle event monitoring.

In some implementations, the system may include one or more of a communication device, a sensor, the control unit, a video system, a user interface, electronic storage, a remote computing device, and/or other components. In some implementations, the remote computing device may include one or more of a processor, a user interface, electronic storage, and/or other components.

The control unit may be configured to transmit vehicle event information to the remote computing device over a network. The control unit may be coupled with the vehicle. The vehicle event information may include vehicle operation information that corresponds to the detected vehicle events. In some implementations, the control unit may be configured such that the detected vehicle events have individual start times and individual end times, and the vehicle event information includes vehicle operation information for periods of time that last from before and/or about the individual start times until about and/or after the individual end times.

The video system may be configured such that video information captured during the periods of time for the vehicle events is transmitted to the remote computing device over the network separate from the vehicle event information. In some implementations, the control unit may be configured to, responsive to detecting individual vehicle events, cause the video system to transmit video information for periods of time that correspond to the detected vehicle events to the computing device. In some implementations, the control unit may be configured to cause the video system to designate which frames of visual information are associated with the individual periods of time that correspond to the individual vehicle events and cause the video system to separately (from the vehicle event information) transmit the designated visual information to the computing device.

In some implementations, the remote computing system may be configured to receive, over the network, the vehicle event information transmitted from the control unit and the video information transmitted from the video system. The remote computing system may be configured to analyze the received vehicle event information and the received video information and, based on such analysis, correlate vehicle event information for the detected vehicle events with received video information captured during the periods of time for the detected vehicle events. The remote computing system may be configured to generate event records that include or identify the video information captured during the periods of time for the detected vehicle events and the vehicle event information for the detected vehicle events. The remote computing system may be configured to synchronize the vehicle event information and the video information by identifying and correlating corresponding phenomena in the vehicle event information and the video information during the vehicle event.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

BRIEF DESCRIPTION OF THE DRAWINGS

FIG. 2B uses a timeline to illustrate detection of a vehicle event and subsequent transmission of vehicle event information and video information to a computing device.

DETAILED DESCRIPTION

Figure 1:
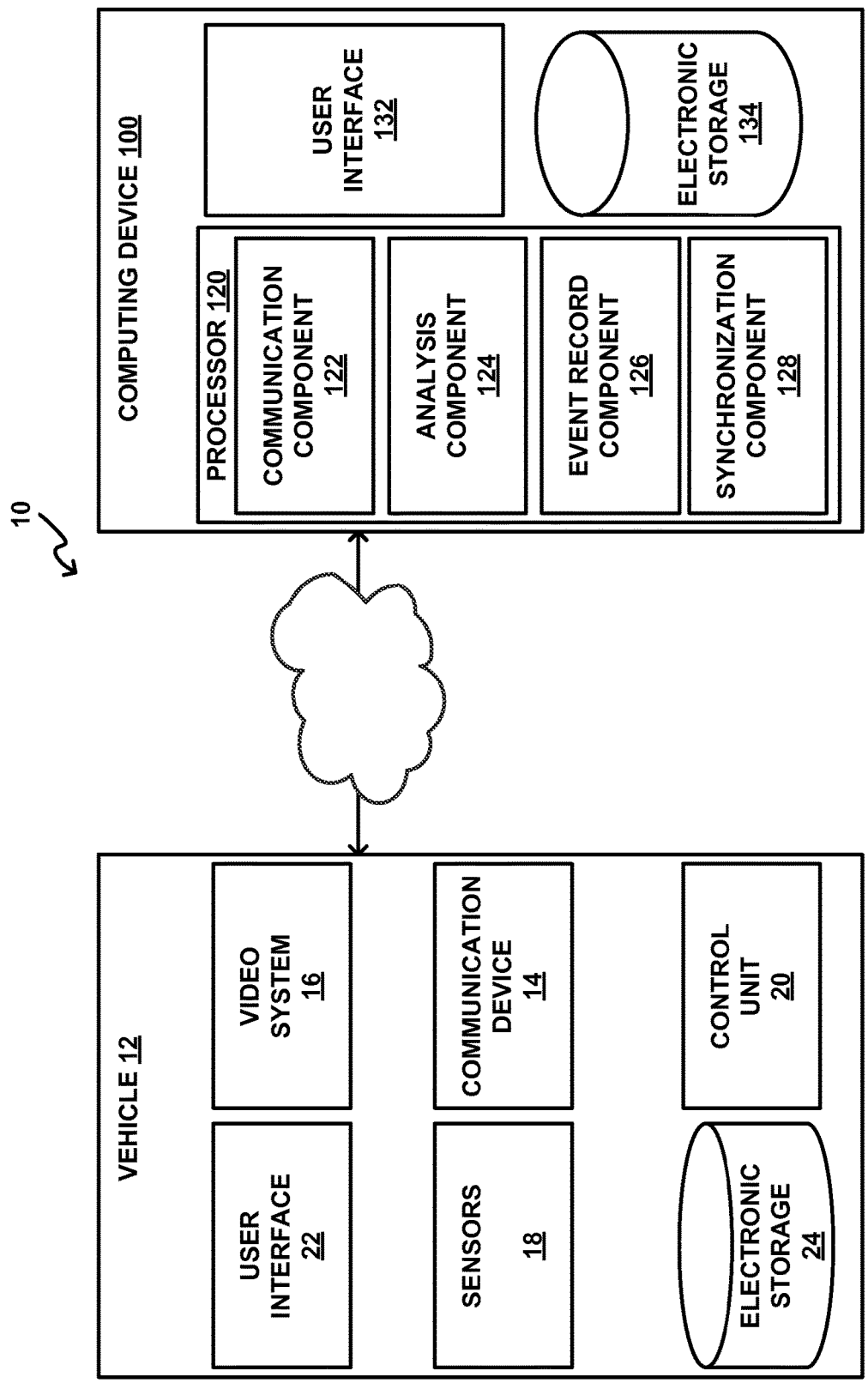
FIG. 1 illustrates a system configured to generate a synchronized electronic vehicle event record.

FIG. 1 illustrates a system 10 configured to generate synchronized electronic vehicle event records. The synchronized electronic vehicle event records may correspond to vehicle events involving a vehicle 12 and/or other vehicles. The synchronized vehicle event records may include vehicle operation information, video information, and/or other information. The synchronized electronic vehicle event records may be generated remotely (e.g., "in the cloud") from vehicle 12 by one or more computing devices 100. System 10 includes a control unit 20 coupled with vehicle 12 configured to detect the vehicle events and transmit vehicle event information that includes vehicle operation information that corresponds to detected vehicle events. Control unit 20 may be configured to communicate with factory installed and/or other (e.g., third party) external (to system 10) vehicle systems (mechanical systems of the vehicle, electrical systems of the vehicle, safety systems of the vehicle, location determination systems of the vehicle, video systems of the vehicle, etc.) to generate the vehicle event information and/or cause other information relevant to a particular vehicle event to be transmitted in addition to the vehicle event information. For example, control unit 20 may be configured to cause a video system 16 to transmit video information captured during periods of time that include the detected vehicle events. By communicating with existing vehicle systems and causing these systems to transmit information related to vehicle events themselves, and generating the synchronized electronic vehicle event records remotely from vehicle 12, system 10 reduces the amount and/or cost of aftermarket equipment that must be installed in vehicle 12 for vehicle event monitoring. In some implementations, system 10 may facilitate determination and/or derivation of various vehicle and/or driver performance characteristics that are not determined in real-time and/or by individual sensors 18 and/or control unit 20 alone.

Vehicle(s) 12 may include automobiles, trucks, delivery vehicles, planes, trains, and/or any other type of vehicle where detecting vehicle events and generating synchronized electronic vehicle event records may be useful. In some implementations, system 10 may include one or more of a communication device 14, a sensor 18 (e.g., one or more sensors 18), control unit 20, video system 16, a user interface 22, electronic storage 24, computing device 100, and/or other components. In some implementations, computing device 100 may include one or more of a processor 120, a user interface 132, electronic storage 134, and/or other components.

Communication device 14 may be configured to facilitate communication between vehicle 12, video system 16, control unit 20, computing device 100, other components of system 10, and/or other computing devices. In some implementations, communication device 14 may be a factory and/or other previously installed communication device coupled with vehicle 12. In some implementations, communication device 14 may be an aftermarket device coupled with vehicle 12 as part of control unit 20, for example. Communication device 14 may be configured to facilitate communication between vehicle 12 and/or components of system 10 coupled with vehicle 12, and computing device 100 and/or other computing devices wirelessly via a network such as the internet and/or other networks, for example. In some implementations, communication device 14 may include one or more of a router and/or other devices that facilitate network connectivity, a transceiver, a signal processor, and/or other components. In some implementations, communication device 14 may be configured to transmit and receive communication signals substantially simultaneously. In some implementations, control unit 20 and video system 16 transmit and/or receive information via communication device 14. However, this is not intended to be limiting. In some implementations, control unit 20 and/or video system 16 communicate with computing device 100 directly (e.g., via the network).

Sensors 18 may be configured to generate output signals conveying information related to the operation and/or the context of vehicle 12. One or more sensors 18 may be coupled with vehicle 12. Information related to the operation and/or context of vehicle 12 may include feedback information from one or more of the mechanical systems of vehicle 12, and/or other information. The mechanical systems of vehicle 12 may include, for example, the engine, the drive train, the lighting systems (e.g., headlights, brake lights), the braking system, the transmission, fuel delivery systems, and/or other mechanical systems. The mechanical systems of vehicle 12 may include one or more mechanical sensors, electronic sensors, and/or other sensors that generate the output signals (e.g., seat belt sensors, tire pressure sensors, etc.). In some implementations, at least one of sensors 18 may be a vehicle system sensor included in an ECM system of vehicle 12.

Information related to the operation and/or context of vehicle 12 may include information related to the environment in and/or around vehicle 12. The vehicle environment may include spaces in and around an interior and an exterior of vehicle 12. The information related to the operation and/or context of vehicle 12 may include information related to movement of vehicle 12, an orientation of vehicle 12, a geographic position of vehicle 12, a spatial position of vehicle 12 relative to other objects, a tilt angle of vehicle 12, an inclination/declination angle of vehicle 12, and/or other information. In some implementations, the output signals conveying the information related to the operation and/or context of vehicle 12 may be generated via non-standard aftermarket sensors installed in vehicle 12. The non-standard aftermarket sensor may include, for example, a microphone, an accelerometer, a gyroscope, a geolocation sensor (e.g., a GPS device), a radar detector, a magnetometer, radar (e.g. for measuring distance of leading vehicle), and/or other sensors.

Although sensors 18 are depicted in FIG. 1 as a single element, this is not intended to be limiting. Sensors 18 may include one or more sensors located adjacent to and/or in communication with the various mechanical systems of vehicle 12, in one or more positions (e.g., at or near the front of vehicle 12) to accurately acquire information representing the vehicle environment (e.g. spatial information, orientation information), and/or in other locations. For example, in some implementations, system 10 may be configured such that a first sensor is located near/in communication with a rotating tire of vehicle 12, and a second sensor located on top of vehicle 12 is in communication with a geolocation satellite. In some implementations, sensors 18 are configured to generate output signals continuously during operation of vehicle 12.

Control unit 20 may be configured to transmit vehicle event information to computing device 100 over a network. Control unit 20 may be coupled with vehicle 12. Control unit 20 may be configured to transmit the vehicle event information via communication device 14 and/or without communication device 14. Control unit 20 may be configured to receive vehicle operation information via output signals generated by sensors 18 and detect vehicle events based on the output signals. For example, events may be detected as described in U.S. patent application Ser. No. 14/186,416, filed Feb. 21, 2014, and incorporated herein by reference. The vehicle event information may include vehicle operation information that corresponds to the detected vehicle events. In some implementations, control unit 20 may be configured such that the detected vehicle events have individual start times and individual end times, and the vehicle event information includes vehicle operation information for periods of time that last from before and/or about the individual start times until about and/or after the individual end times. For example, the detected vehicle events may include a first vehicle event that has a first start time and a first end time, and the vehicle event information for the first vehicle event includes vehicle operation information for a period of time that lasts from before and/or about the first start time until about and/or after the first end time.

In some implementations, control unit 20 may be configured such that detecting vehicle events includes determining one or more vehicle parameters of vehicle 12. Control unit 20 may determine the vehicle parameters based on the information conveyed by the output signals from sensors 18, information provided by external systems and/or databases, and/or other information. The one or more vehicle parameters may be related to the operation of vehicle 12, the context of vehicle 12, and/or other information. For example, the one or more vehicle parameters may be related to one or more of an acceleration, a direction of travel, a turn diameter, a vehicle speed, an engine speed (e.g. RPM), a duration of time, a closing distance, a lane departure from an intended travelling lane of the vehicle, a following distance, physical characteristics of vehicle 12 (such as mass and/or number of axles, for example), a tilt angle of vehicle 12, an inclination/declination angle of vehicle 12, whether or not brakes are being applied, a number of times a specific vehicle control system (e.g., the brakes) is activated, a temperature, fuel use, and/or other parameters. In some implementations, control unit 20 may be configured to determine one or more of the vehicle parameters one or more times in an ongoing manner during operation of vehicle 12. In some implementations, control unit 20 may be configured to determine one or more of the vehicle parameters at regular time intervals during operation of vehicle 12. The timing of the vehicle parameter determinations (e.g., in an ongoing manner, at regular time intervals, etc.) may be programmed at manufacture, obtained responsive to user entry and/or selection of timing information via user interface 22 and/or 132, and/or may be determined in other ways.

In some implementations, control unit 20 may be configured such that detecting vehicle events includes obtaining one or more pre-determined vehicle event criteria sets. The pre-determined vehicle event criteria sets may describe individual vehicle events (e.g., such as the first vehicle event described in the example above). The pre-determined vehicle event criteria sets may be programmed at manufacture, obtained by control unit 20 responsive to user entry and/or selection of information related to pre-determined vehicle event criteria sets via user interface 22 and/or 132, obtained from electronic storage 24 and/or 134, and/or may be obtained in other ways. In some implementations, the pre-determined vehicle event criteria sets may be received from external computing systems such as computing device 100 and/or other computing systems.

In some implementations, control unit 20 may be configured such that detecting vehicle events includes detecting vehicle events in real-time or near real-time. Control unit 20 may be configured to detect execution of a specific vehicle event based on the information conveyed by the output signals generated by sensors 18, the vehicle parameters, the pre-determined criteria sets, and/or based on other information. A specific vehicle event may be detected based on the determined vehicle parameters and the obtained pre-determined vehicle event criteria sets by comparing the determined vehicle parameters to the criteria sets. For example, the first vehicle event may be detected responsive to the determined parameters satisfying one or more individual criteria in a first criteria set associated with the first vehicle event. By way of a non-limiting example, control unit 20 may determine that a vehicle operator has tapped his brakes more than X times (e.g., no single trigger) in Y time frame (thus satisfying multiple individual brake tapping criteria as well as a time frame criterion) and trigger a vehicle event because the driver may be drowsy and/or nodding off.

In some implementations, control unit 20 may be mounted to and/or otherwise coupled with vehicle 12. In some implementations, control unit 20 may be and/or include an ECM coupled with operational systems of vehicle 12 such as vehicle sensors (e.g., included in sensors 18), vehicle communication systems (e.g., included in communication device 14), vehicle camera systems (e.g., included in video system 16), and/or other vehicle systems. In some implementations, control unit 20 may include and/or be coupled with a vehicle user interface 22, vehicle electronic storage 24, and/or other components. In some implementations, control unit 20 may include and/or be coupled with an audible alarm. In some implementations, control unit 20 may be operatively coupled with vehicle control systems such as the engine and/or brakes, communication device 14, video system 16, and/or other devices. In some implementations, control unit 20 may be configured to operate based on predetermined and/or preprogrammed algorithms and/or other information stored in electronic storage 24 and/or in other locations. The preprogrammed algorithms and/or other information may cause control unit 20 to function as described herein and/or to perform other functions such as determining and/or generating information related to an operator score, generating alerts and/or other operator feedback (e.g., presented to the operator via user interface 22), and/or performing other functions based on the predetermined algorithms and/or other information stored in electronic storage 24, for example. In some implementations, control unit 20 may be configured to initiate changes in vehicle control systems (e.g., such as reducing engine power and/or applying brakes, turning on/off other systems that should/should not be used while a condition (event) that control unit 20 has detected/determined is ongoing), turn on/off feedback to drivers via a vehicle user interface (e.g., user interface 22) and/or audible alerts, send information to be stored for future evaluation, cause the video system 16 and/or other in-vehicle systems to perform one or more specified functions, facilitate transmission of information via communication device 14 to computing device 100 and/or other computing devices, machines, and/or vehicles, and/or perform other activities.

Video system 16 may be configured to acquire video information representing a vehicle environment. The video information may include visual information from an environment about vehicle 12, information related to an individual device that captures the video information, and/or other information. The vehicle environment may include spaces in and/or around a vehicle. In some implementations, video system 16 may be configured to store the acquired video information locally in electronic memory associated with video system 16, transmit the acquired video information to computing device 100 via communication device 14, transmit the acquired video information directly to computing device 100 (e.g., by directly communicating with computing device 100 via a network), and/or process the acquired video information in other ways. In some implementations, video system 16 may be configured to transmit, over the network, video information captured during periods of time for the detected vehicle events. Video system 16 may be configured such that the video information includes video information for periods of time that last from before and/or about the individual start times of the detected vehicle events until about and/or after the individual end times of the detected vehicle events. Continuing with the example above, the periods of time may include video information for a first period of time for the first vehicle event that lasts from before and/or about the individual start time of the first detected vehicle event until about and/or after the end time of the first vehicle event.

Video system 16 may be configured such that the video information captured during the periods of time for the vehicle events is transmitted to computing device 100 via communication device 14 or without communication device 14 (e.g., directly to computing device 100) separate from the vehicle event information (described above), such that the video information captured during the first period of time is transmitted separate from the vehicle event information for the first vehicle event, for example.

In some implementations, control unit 20 may be configured to, responsive to detecting individual vehicle events, cause video system 16 to transmit video information for periods of time that correspond to the detected vehicle events to computing device 100. The control unit may, for example, communicate locally with video system 16 (e.g. via the vehicle network, Ethernet, Bluetooth, etc.) and/or indirectly through a backend service that is in communication with both control unit 20 and video system. 16. In some implementations, control unit 20 may be configured to cause video system 16 to designate which frames of visual information are associated with the individual periods of time that correspond to the individual vehicle events and cause video system 16 to separately (from the vehicle event information) transmit the designated visual information to computing device 100. In some implementations, control unit 20 may be configured to cause video system 16 to designate a first set of frames of visual information that includes frames for a period of time that lasts from before the start time until after the end time of and individual vehicle event, and a second set of frames of visual information that includes frames for a period of time that lasts from the start time until the end time of the individual vehicle event. These implementations are not intended to be limiting. Control unit 20 may cause video system 16 to designate any frames for transmission that are relevant to an individual vehicle event.

In some implementations, control unit 20 may communicate locally (e.g., within vehicle 12) with video system 16. Control unit 20 may, for example, generate a globally-unique UI (GUID) that identifies the vehicle event, and transmit the GUID along with pre-duration (seconds) and post-duration (seconds) parameters to video system 16. In response, video system 16 may transmit (and/or queue for transmission) a segment of video information that is identified by the GUID and/or represents the segment of time that is bounded by pre-duration and post-duration parameters as they are applied at the point in time that video system 16 received such a message from control unit 20. For example, if the message is received at 5:25:20 PM (per a video system clock) and pre-duration is set to 12 seconds and post-duration is set to 20 seconds, video system 16 may transmit a segment of video information that corresponds to a 5:25:08 PM, 5:25:40 PM interval. A slight difference in local clocks (seconds or milliseconds) between control unit 20 and video system 16 is accounted for as described herein (e.g., analysis, synchronization, etc.). For example, the GUID may also be part of vehicle event record 200. To the extent that the latency of local message transmission is small and to the extent that video system 16 responds to the local message (from control unit 20) relatively quickly, the alignment of the two datasets will be an easier task, but this is not guaranteed (e.g., synchronization step 310 described below may be helpful, but not always necessary).

Figure 2A:
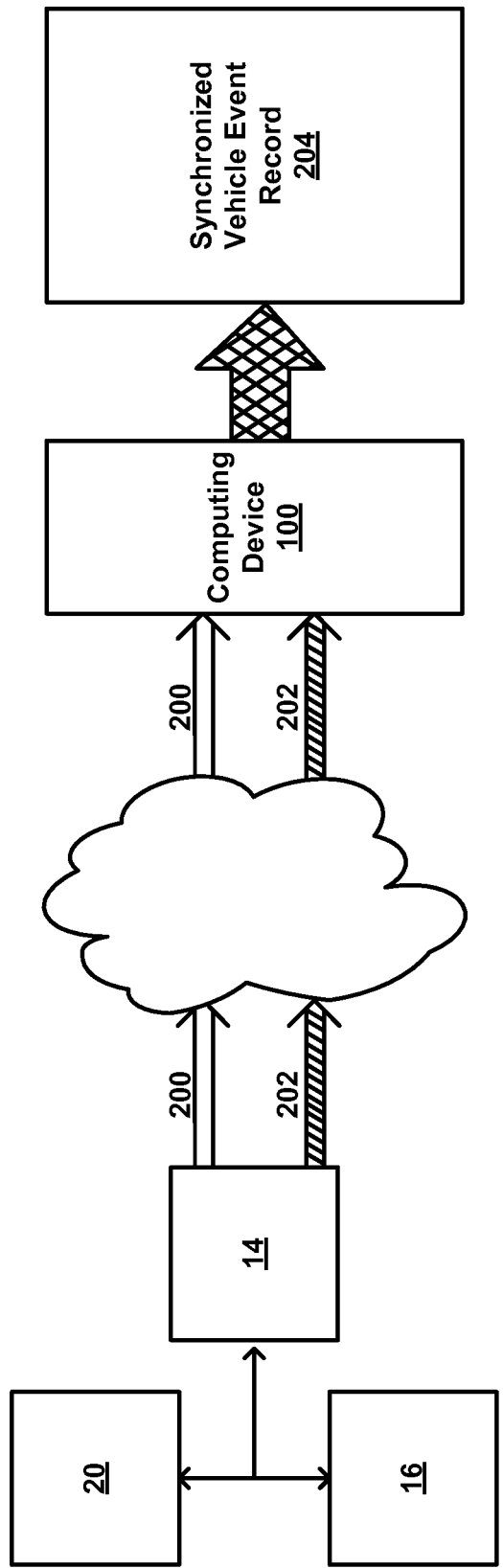
FIG. 2A illustrates separate transmission of vehicle event information and video information.

By way of a non-limiting example, FIG. 2A illustrates separate transmission of vehicle event information 200 and video information 202 via the network to computing device 100. Computing device 100 generates a single synchronized electronic vehicle event record 204 based on separately transmitted vehicle event information 200 and video information 202 (described further below). In this example, control unit 20 has transmitted vehicle event information 200 via communication device 14 and video system 16 has transmitted video information 202 also via communication device 14. But this is not intended to be limiting. As described herein, the transmission of vehicle event information 200 and/or video information 202 made be made directly from control unit 20 and/or video system 16 without the use of communication device 14. In addition, the separate transmissions of vehicle event information 200 and video information 202 may be made substantially simultaneously and/or at different times. For example, control unit 20 may detect a vehicle event and transmit vehicle event information 200, and then video system 16 may transmit video information 202 that corresponds to the same vehicle event. In this example implementation, control unit 20 may, responsive to detecting the vehicle event, cause video system 16 to transmit video information for a period of time that corresponds to the detected vehicle event to computing device 100 such that the transmission from video system 16 happens after the transmission from control unit 20. In some implementations, video system 16 may be instructed to transmit video information for a period of time by computing device 100. This would in turn be in response to computing device 100 receiving vehicle event information and computing device 100 being aware that control unit 20 is not able to transmit local (within vehicle) messages to video system 16. In such cases, computing device 100 may send a remote message to video system 16 to generate and transmit video information that corresponds in time to the vehicle event. (This presumes that video system 16 retains information for an extended period of time (minutes and hours if not days), which is the case with most DVR solutions on the market.)

By way of a second non-limiting example, FIG. 2B uses a timeline 252 to illustrate detection of a vehicle event 250 and subsequent transmission of vehicle event information 200 and video information 202 to computing device 100. As shown in FIG. 2B, sensors 18 generate output signals 254 conveying information related to the operation of vehicle 12 (shown in FIG. 1). Control unit 20 detects vehicle event 250 based on the output signals and/or other information as described herein and provides an indication 256 of the vehicle event to video system 16. Control unit 20 then generates vehicle event information 200 that corresponds to vehicle event 250 and transmits 258 vehicle event information 200 to computing device 100. Responsive to receiving indication 256 from control unit 20, video system 16 generates and/or designates (as described above) video information 202 and then transmits 260 video information 202 to computing device 100. Computing device 100 then generates single synchronized electronic vehicle event record 204 based on separately transmitted vehicle event information 200 and video information 202 (described further below).

Returning to FIG. 1, video system 16 may include systems for compiling and/or collecting video information, for example, video cameras, digital cameras, analog cameras, still cameras, infrared sensors, a VCR, a DVR, non-transitory electronic memory, and/or other video capture devices that acquire visual information. In some implementations, video system 16 may include vehicle system-integrated video capture devices (e.g., devices such as a back-up camera installed in vehicle 12 by the vehicle manufacturer), non-system integrated video capture devices (e.g., third party and/or aftermarket systems installed in vehicle 12), and/or other video capture devices. In some implementations, video system 16 may include video recording devices such as smart phone cameras and/or other devices not physically coupled to the vehicle and/or control unit 20, for example. Such devices may communicate wirelessly with control unit 20, communication device 14, computing device 100, and/or other components of system 10, for example. The visual information may include videos, images, clips, broadcasts, pictures, visual data and/or other visual information representing the vehicle environment. In some implementations, the visual information may include visual information that provides information related to a vehicle's speed, location, heading, and/or other vehicle information. In some implementations, video system 16 may include multiple video capture devices positioned in and/or around and/or otherwise coupled with vehicle 12. In some implementations, these video capture devices may be synchronized together to provide a single coordinated view of the inside and/or the outside of vehicle 12. In some implementations, the video information captured from multiple video capture devices may not be synchronized. In such implementations, the video information may be transmitted to computing device 100, for example, where it may be synchronized with other video and/or non-video data to create video event records (e.g., as described herein).

Although video system 16 is depicted in FIG. 1 as a single element coupled with vehicle 12, this is not intended to be limiting. Video system 16 may include one or more video capture devices located on the interior of vehicle 12, the exterior of vehicle 12, and/or in any location that facilitates communication with communication device 14, control unit 20, computing device 100, and/or other components of system 10.

Computing device 100 may include one or more physical computer processors 120, a user interface 132, electronic storage 134, and/or other components. Computing device 100 may be located remotely from vehicle 12. Computing device 100 may be configured to enable a user to interface with system 10 (e.g., via user interface 132), and/or provide other functionality attributed herein to computing device 100. Computing device 100 may be configured to communicate with communication device 14, control unit 20, video system 16, sensors 18, and/or other components of system 10 that are coupled with vehicle 12 via a network such as the internet, cellular network, Wi-Fi network, Ethernet, and/or other interconnected computer networks. Computing device 100 may facilitate viewing and/or analysis of the information conveyed by the output signals of sensors 18, the information determined by control unit 20, the information recorded by video system 16, the information communicated by communication device 14, and/or other information. By way of non-limiting example, remote computing device 100 may include one or more of a server, a server cluster, desktop computer, a laptop computer, a handheld computer, a tablet computing platform, a NetBook, a Smartphone, a gaming console, and/or other computing platforms.

As described above, in some implementations, computing device 100 may be and/or include a server. The server may include communication lines, or ports to enable the exchange of information with a network, communication device 14, video system 16, sensors 18, control unit 20, and/or other computing platforms. The server may include a plurality of processors, electronic storage, hardware, software, and/or firmware components operating together to provide the functionality attributed herein to computing device 100. For example, the server may be implemented by a cloud of computing platforms operating together as a system server.

Processor 120 may be configured to provide information processing capabilities in computing device 100 and/or system 10 in general. As such, processor 120 may comprise one or more of a digital processor, an analog processor, a digital circuit designed to process information, an analog circuit designed to process information, a state machine, and/or other mechanisms for electronically processing information. Although processor 120 is shown in FIG. 1 as a single entity, this is for illustrative purposes only. In some implementations, processor 120 may comprise a plurality of processing units. These processing units may be physically located within the same device (e.g., computing device 100), or processor 120 may represent processing functionality of a plurality of devices operating in coordination.

As shown in FIG. 1, processor 120 may be configured to execute one or more computer program components. The computer program components may comprise one or more of a communication component 122, an analysis component 124, an event record component 126, a synchronization component 128, and/or other components. Processor 120 may be configured to execute components 122, 124, 126, and/or 128 by software; hardware; firmware; some combination of software, hardware, and/or firmware; and/or other mechanisms for configuring processing capabilities on processor 120. It should be appreciated that although components 122, 124, 126, and 128 are illustrated in FIG. 1 as being co-located within a single processing unit, in implementations in which processor 120 comprises multiple processing units, one or more of components 122, 124, 126, and/or 128 may be located remotely from the other components. The description of the functionality provided by the different components 122, 124, 126, and/or 128 described herein is for illustrative purposes, and is not intended to be limiting, as any of components 122, 124, 126, and/or 128 may provide more or less functionality than is described. For example, one or more of components 122, 124, 126, and/or 128 may be eliminated, and some or all of its functionality may be provided by other components 122, 124, 126, and/or 128. As another example, processor 120 may be configured to execute one or more additional components that may perform some or all of the functionality attributed below to one of components 122, 124, 126, and/or 128.

In some implementations, computing device 100 (e.g., by way of communication component 122, analysis component 124, event record component 126, and/or synchronization component 128) is configured to "marry" the transmitted vehicle event information and the video information to generate a synchronized electronic vehicle event record for a corresponding vehicle event. As described herein, in some implementations, this generating is performed remotely from vehicle 12.

Communication component 122 may be configured to receive, over the network, the vehicle event information transmitted from control unit 20, and separately, the video information transmitted from video system 16 captured during periods of time for the detected vehicle events. Continuing with the example above, the video information captured during the first period of time (that corresponds to the first vehicle event) is received separate from the vehicle event information for the first vehicle event, for example.

Analysis component 124 may be configured to analyze the received vehicle event information and the received video information. Based on such analysis, analysis component 124 may be configured to correlate vehicle event information for the detected vehicle events with received video information captured during the periods of time for the detected vehicle events. Analysis component 124 may be configured to correlate vehicle event information for the detected vehicle events with received video information captured during the periods of time for the detected vehicle events such that the video information captured during the first period of time is correlated with the vehicle event information for the first vehicle event, for example. In some implementations, correlation may be performed based on the GUID (described above), timestamps captured by video system 16 and/or control unit 20, and/or other information.

Event record component 126 may be configured to generate event records that include and/or identify the video information captured during the periods of time for the detected vehicle events and the vehicle event information for the detected vehicle events. Event record component 126 may be configured such that the event records include a first event record for the first vehicle event, for example. The first event record may include and/or identify the video information captured during the first period of time and the vehicle event information for the first vehicle event.

Synchronization component 128 may be configured to synchronize the vehicle event information and the video information. Synchronization component 128 may be configured to synchronize the vehicle event information and the video information by identifying and correlating corresponding phenomena in the vehicle event information and the video information during the vehicle event. For example, synchronization component 128 may be configured to observe that vehicle speed (from a GPS, a wheel sensor, and/or other sensors) returns to zero (e.g. the vehicle stops) and correlate this to the point at which the difference between consecutive video frames becomes minimal, indicating visually that the vehicle has stopped. Synchronization component 128 may be configured to synchronize the vehicle event information and the video information such that the video information captured during the first period of time is synchronized with the vehicle event information for the first vehicle event, for example.

In some implementations, synchronization component 128 may be configured such that identifying and correlating corresponding phenomena in the vehicle event information and the video information includes identifying and correlating one or more of time information (e.g., a time of day and/or other time stamp determined by control unit 20) associated with the vehicle event information for an individual vehicle event and time information (e.g., a time of day and/or other time stamp determined by video system 16) associated with the video information captured during the period of time that corresponds to the individual vehicle event. In some implementations, synchronization component 128 may be configured such that identifying and correlating corresponding phenomena in the vehicle event information and the video information includes identifying and correlating information indicative of a physical event conveyed by the output signals included in the vehicle event information for an individual vehicle event and information indicative of the same physical event conveyed by the video information captured during the period of time that corresponds to the individual vehicle event.

In some implementations, synchronization may be based on geographical location of a vehicle and/or other keys. By way of non-limiting example, a vehicle's location may be determined and/or recorded at the start of a video data stream. Data in the video data stream may be recorded at some frequency (e.g., x number of data points per second). The vehicle's location may also be recorded in a vehicle data stream at some other frequency (e.g., y data points per second). Synchronization component 128 may then use the vehicle's location to determine where to start synchronizing data from the video stream and the vehicle data stream and align data in different streams based on the frequency information.

In some implementations, responsive to synchronization by synchronization component 128, communication component 122 may be configured to facilitate review of the synchronized event record by a reviewer. The reviewer may be remotely located from vehicle 12 and/or computing device 100, in a review center for example, viewing the synchronized event records in real-time and/or at a later time. The remote reviewer may score operators, provide feedback to operators, develop coaching plans, and/or take other actions based on reviews of synchronized event records, for example.

User interface 22 (coupled with vehicle 12) and/or user interface 132 (included in computing device 100 may be configured to provide an interface between system 10 and users through which the users may provide information to and receive information from system 10. This enables predetermined profiles, criteria, data, cues, results, instructions, and/or any other communicable items, collectively referred to as "information," to be communicated between a user and one or more of vehicle 12, communication device 14, video system 16, sensors 18, control unit 20, computing device 100, and/or other components of system 10. By way of a non-limiting example, a user may enter, select, and/or upload predetermined vehicle event criteria using user interface 22 and/or user interface 132.

Examples of interface devices suitable for inclusion in user interface 22 and/or user interface 132 comprise a keypad, buttons, switches, a keyboard, knobs, levers, a display screen, a touch screen, speakers, a microphone, an indicator light, an audible alarm, a printer, a tactile feedback device, and/or other interface devices. In one implementation, user interface 22 and/or user interface 132 comprises a plurality of separate interfaces. In one implementation, user interface 22 comprises at least one interface that is provided integrally with control unit 20.

It is to be understood that other communication techniques, either hard-wired or wireless, are also contemplated by the present disclosure as user interface 22 and/or user interface 132. In some implementations, user interface 22 and/or user interface 132 may be included in a removable storage interface provided by electronic storage 24 (e.g., in control unit 20) and/or electronic storage 134 (e.g., in computing device 100). In these examples, information may be loaded into system 10 wirelessly from a remote location, from removable storage (e.g., a smart card, a flash drive, a removable disk, etc.), and/or other sources that enable the user(s) to customize the implementation of system 10. Other exemplary input devices and techniques adapted for use with system 10 as user interface 22 and/or user interface 132 comprise, but are not limited to, an RS-232 port, RF link, an IR link, modem (telephone, cable, and/or other modems), a cellular network, a Wi-Fi network, a local area network, and/or other devices and/or systems. In short, any technique for communicating information with system 10 is contemplated by the present disclosure as user interface 22 and/or user interface 132.

Electronic storage 24 (coupled with vehicle 12) and/or electronic storage 134 (included in computing device 100) may comprise electronic storage media that electronically stores information. The electronic storage media of electronic storage 24 and/or electronic storage 134 may comprise one or both of system storage that is provided integrally (i.e., substantially non-removable) with system 10 and/or removable storage that is removably connectable to system 10 via, for example, a port (e.g., a USB port, a firewire port, etc.) or a drive (e.g., a disk drive, etc.). Electronic storage 24 and/or 134 may comprise one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 24 and/or 134 may store software algorithms (e.g., vehicle event detection algorithms), recorded video event data, information determined by control unit 20 and/or processor 120, information received via user interfaces 22 and/or 132, and/or other information that enables system 10 to function properly. Electronic storage 24 and/or 134 may be (in whole or in part) a separate component within system 10, or electronic storage 24 and/or 134 may be provided (in whole or in part) integrally with one or more other components of system 10 (e.g., control unit 20, processor 120, etc.).

Figure 3:
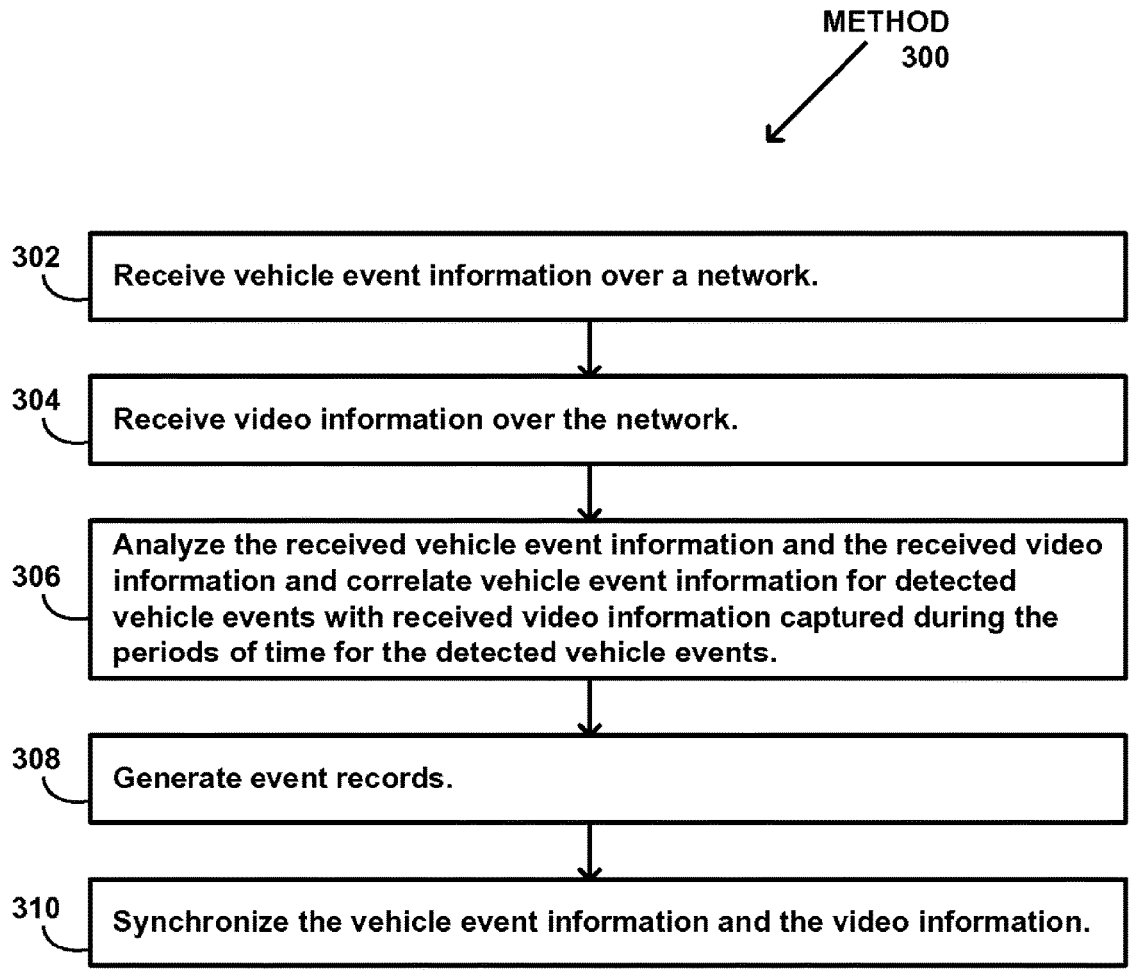
FIG. 3 illustrates a method for generating a synchronized electronic vehicle event record.
Figure 4:
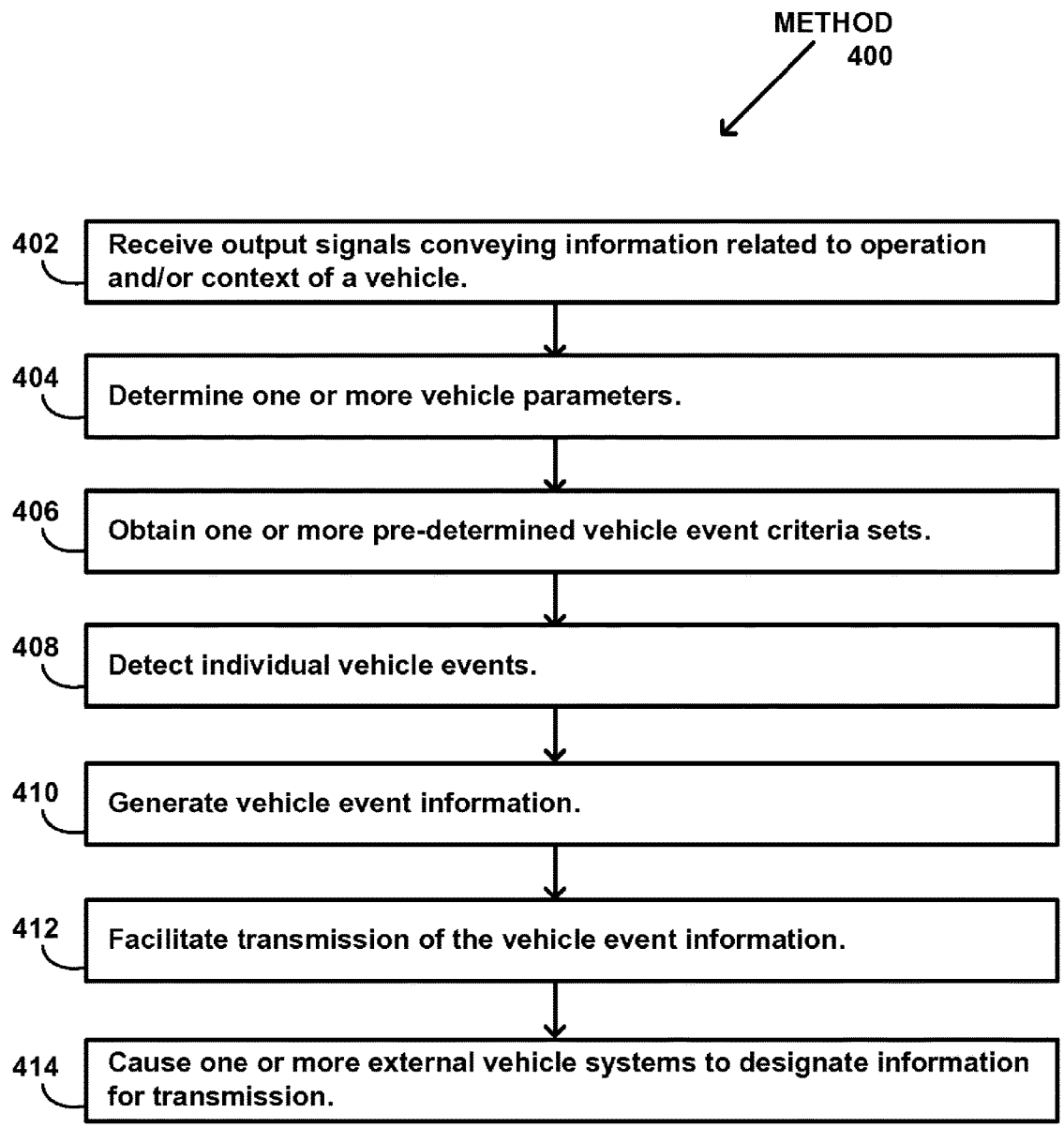
FIG. 4 illustrates a method for detecting vehicle events with a detection system that is coupled to a vehicle and transmitting vehicle event information to a remotely located computing device.

FIG. 3 illustrates a method 300 for generating a synchronized electronic vehicle event record. FIG. 4 illustrates a method 400 for detecting vehicle events with a detection system (which may be coupled to the vehicle) and transmitting vehicle event information to a remotely located computing device. The operations of method 300 and/or 400 presented below are intended to be illustrative. In some implementations, method 300 and/or 400 may be accomplished with one or more additional operations not described, and/or without one or more of the operations discussed. Additionally, the order in which the operations of method 300 and/or 400 are illustrated (in FIG. 3 and FIG. 4) and described below is not intended to be limiting. In some implementations, two or more of the operations may occur substantially simultaneously.

In some implementations, method 300 and/or 400 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 300 and/or 400 in response to instructions stored electronically on one or more electronic storage mediums. The one or more processing devices may include one or more devices configured through hardware, firmware, and/or software to be specifically designed for execution of one or more of the operations of method 300 and/or 400.

Referring to FIG. 3 and method 300, at an operation 302, vehicle event information may be received over a network. The vehicle event information may be transmitted from a control unit mounted to a vehicle. The control unit may be configured to (i) receive vehicle operation information via output signals generated by sensors coupled with the vehicle, and (ii) detect vehicle events based on the output signals. The vehicle event information may include vehicle operation information that corresponds to the detected vehicle events. The detected vehicle events may include a first vehicle event, for example. In some implementations, the control unit may be configured such that the detected vehicle events have individual start times and individual end times, and the vehicle event information includes vehicle operation information for periods of time that last from before the individual start times until after the individual end times. In some implementations, operation 302 may be performed by one or more physical computer processor components the same as or similar to communication component 122 (shown in FIG. 1 and described herein).

At an operation 304, video information may be received over the network. The video information may be transmitted from a video system mounted to the vehicle. The video information may be captured during periods of time for the detected vehicle events. In some implementations, the video system is configured such that the video information includes video information for periods of time that last from before the individual start times until after the individual end times of vehicle events. The periods of time may include a first period of time for the first vehicle event, for example. The video information may include consecutive frames of visual information representing an environment about the vehicle. The video system may be physically separate and distinct from the control unit. The video information may be transmitted separate from the vehicle event information such that the video information captured during the first period of time is transmitted separate from the vehicle event information for the first vehicle event. In some implementations, the control unit may cause the transmission of the video information responsive to detection of a vehicle event. In some implementations, operation 304 may be performed by one or more physical computer processor components the same as or similar to communication component 122 (shown in FIG. 1 and described herein).

At an operation 306, the received vehicle event information and the received video information may be analyzed and correlated. The correlation may be based on the analysis. The vehicle event information for detected vehicle events may be correlated with received video information captured during the periods of time for the detected vehicle events. The video information captured during the first period of time may be correlated with the vehicle event information for the first vehicle event, for example. In some implementations, operation 306 may be performed by one or more physical computer processor components the same as or similar to analysis component 124 (shown in FIG. 1 and described herein).

At an operation 308, event records may be generated. The generated event records may include and/or identify the video information captured during the periods of time for the detected vehicle events and the vehicle event information for the detected vehicle events. The event records may include a first event record for the first event, for example. The first event record may include and/or identify the video information captured during the first period of time and the vehicle event information for the first vehicle event, for example. In some implementations, operation 308 may be performed by one or more physical computer processor components the same as or similar to event record component 126 (shown in FIG. 1 and described herein).

At an operation 310, the vehicle event information and the video information may be synchronized. Synchronizing the vehicle event information and the video information may include identifying and correlating corresponding phenomena in the vehicle event information and the video information during the vehicle event such that the video information captured during the first period of time is synchronized with the vehicle event information for the first vehicle event, for example. Identifying and correlating corresponding phenomena in the vehicle event information and the video information may include identifying and correlating one or more of first time information associated with the vehicle event information for the first vehicle event and second time information associated with the video information captured during the first period of time; or information indicative of a physical event conveyed by the output signals included in the vehicle event information for the first vehicle event and information indicative of the same physical event conveyed by the video information captured during the first period of time. In some implementations, operation 310 may be performed by one or more physical computer processor components the same as or similar to synchronization component 128 (shown in FIG. 1 and described herein).

Referring to FIG. 4 and method 400, at an operation 402, output signals conveying information related to the operation of a vehicle, the context of the vehicle, and/or other information may be received. Operation 402 may include receiving output signals conveying information related to one or more of mechanical systems of the vehicle, movement of the vehicle, an orientation of the vehicle, a geographic position of the vehicle, a spatial position of the vehicle relative to other objects, and/or other operational/contextual characteristics of the vehicle. In some implementations, operation 402 may be performed by a control unit the same as or similar to control unit 20 (shown in FIG. 1 and described herein).

At an operation 404, one or more vehicle parameters may be determined. The one or more vehicle parameters may be determined based on the output signals and/or other information. The one or more vehicle parameters may be related to the operation of the vehicle, the context of the vehicle, and/or other vehicle parameters. In some implementations, the one or more vehicle parameters may be determined one or more times in an ongoing manner during operation of the vehicle. In some implementations, operation 404 may be performed by a control unit the same as or similar to control unit 20 (shown in FIG. 1 and described herein).

At an operation 406, one or more pre-determined vehicle event criteria sets may be obtained. The one or more pre-determined vehicle event criteria sets may include criteria sets associated with individual vehicle events. The one or more pre-determined criteria sets may include a first pre-determined criteria set for a first vehicle event, for example. The first criteria set may include a first individual criterion and a second individual criterion. In some implementations, the first individual criterion and the second individual criterion for the first pre-determined criteria set may be associated with information conveyed by output signals from at least two different sensors. In some implementations, operation 406 may be performed by a control unit the same as or similar to control unit 20 (shown in FIG. 1 and described herein).

At an operation 408, individual vehicle events may be detected. The detection may be based on the vehicle parameters and the pre-determined criteria sets. Vehicle events may be detected by comparing the determined vehicle parameters to the criteria sets such that, for example, the first vehicle event is detected responsive to the determined parameters satisfying the first individual criterion and the second individual criterion. In some implementations, operation 408 may be performed by a control unit the same as or similar to control unit 20 (shown in FIG. 1 and described herein).

At an operation 410, vehicle event information may be generated. The vehicle event information may include vehicle operation and/or context information for periods of time that correspond to the detected vehicle events. In some implementations, operation 410 may be performed by a control unit the same as or similar to control unit 20 (shown in FIG. 1 and described herein).

At an operation 412, transmission of the vehicle event information may be facilitated. In some implementations, operation 412 may include transmission of vehicle event information that corresponds to the detected vehicle events to a remotely located computing device. In some implementations, operation 412 may be performed by a control unit the same as or similar to control unit 20 (shown in FIG. 1 and described herein).

At an operation 414, one or more external vehicle systems may be caused to designate information for transmission. In some implementations, operation 414 includes causing one or more external vehicle systems that generate information about the vehicle to designate information associated with periods of time that correspond to the detected vehicle events for transmission to the remotely located computing device. In some implementations, the one or more external vehicle systems include a video system that is caused to designate which frames of visual information are associated with the periods of time that correspond to the vehicle events and transmit the designated visual information to the remotely located computing device. In some implementations, operation 412 may be performed by a control unit the same as or similar to control unit 20 (shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system configured to generate vehicle event records for a fleet of vehicles, wherein the fleet of vehicles includes a first vehicle and a second vehicle, the system comprising:
    a centralized cloud server including one or more physical computer processors located remotely from both the first and the second vehicle, wherein the centralized cloud server is geographically separated from the first vehicle and the second vehicle, the one or more physical computer processors being configured by computer readable instructions to:
        receive, over a network during a first transmission, vehicle event information from a control unit mounted to the first vehicle, the control unit configured to (i) receive vehicle operation information via output signals generated by sensors coupled with the first vehicle and (ii) detect vehicle events based on the output signals, the vehicle event information including vehicle operation information and first time information that correspond to the detected vehicle events, wherein the detected vehicle events including a first vehicle event, wherein the vehicle event information for the first vehicle event is associated with the first time information;

receive, over the network during a second transmission, video information corresponding to the first vehicle event from a video system, the second transmission being separate from the first transmission, wherein the video information includes different information than the vehicle event information, the video system including a video camera, the video system being mounted to the first vehicle and being physically separate and distinct from the control unit, wherein the video information has been captured during periods of time for the detected vehicle events, the periods of time including a first period of time for the first vehicle event, the video information including second time information and consecutive frames of visual information representing an environment about the first vehicle, wherein the video information for the first vehicle event is associated with the second time information;

receive, over the network during a third transmission, second vehicle event information from a second control unit mounted to the second vehicle, the second vehicle event information including vehicle operation information and third time information that correspond to detected vehicle events of the second vehicle, wherein the detected vehicle events including a second vehicle event, wherein the second vehicle event information for the second vehicle event is associated with the third time information;

receive, over the network during a fourth transmission, second video information corresponding to the second vehicle event, the fourth transmission being separate from the third transmission, wherein the second video information includes different information than the second vehicle event information, the second video information including fourth time information and consecutive frames of visual information representing an environment about the second vehicle, wherein the second video information for the second vehicle event is associated with the fourth time information;

analyze the vehicle event information received during the first transmission to identify information indicative of a physical event conveyed by the output signals, wherein the physical event occurred in the first period of time;

analyze the video information received during the second transmission to identify information indicative of the same physical event;

correlate, by the one or more physical computer processors, the vehicle event information received during the first transmission with the video information received during the second transmission based on the analysis of both the vehicle event information and the video information such that the correlating is performed at a location of the centralized cloud server that is remote from the first vehicle, wherein correlating the vehicle event information with the video information includes correlating the first time information and the second time information;

analyze the second vehicle event information received during the third transmission to identify information indicative of a second physical event;

analyze the second video information received during the fourth transmission to identify information indicative of the same second physical event;

correlate, by the one or more physical computer processors, the second vehicle event information received during the third transmission with the second video information received during the fourth transmission based on the analysis of both the second vehicle event information and the second video information such that the correlating is performed at the location of the centralized cloud server that is remote from the second vehicle, wherein correlating the second vehicle event information with the second video information includes correlating the third time information and the fourth time information;

generate a first event record that includes or identifies (i) the video information that corresponds to the first vehicle event and (ii) the vehicle event information for the first vehicle event; and generate a second event record that includes or identifies (i) the second video information that corresponds to the second vehicle event and (ii) the second vehicle event information for the second vehicle event.

2. The system of claim 1, wherein the one or more physical computer processors are configured such that correlating the vehicle event information with the video information includes identifying and correlating:
information indicative of the physical event conveyed by the output signals included in the vehicle event information for the first vehicle event and information indicative of the same physical event conveyed by the video information captured during the first period of time.

3. The system of claim 1, wherein the control unit is configured such that:
the detected vehicle events have individual start times and individual end times, and
the vehicle event information includes vehicle operation information for periods of time that last from before the individual start times until after the individual end times; and
wherein the video system is configured such that the video information includes video information for periods of time that last from before the individual start times until after the individual end times.

4. The system of claim 1, wherein the video system is included in one or more external vehicle systems that generate information about the first vehicle.

5. The system of claim 1, wherein the video camera is an aftermarket camera.

6. The system of claim 1, wherein the one or more physical computer processors are further configured by computer readable instructions to:
responsive to receiving the vehicle event information, send a message from the centralized cloud server to the video system, wherein the message requests that the video system transmits the video information to the centralized cloud server, wherein the video information corresponds to the first vehicle event.

7. The system of claim 6, wherein the video information is received over the network responsive to the message.

8. The system of claim 1, wherein the first vehicle includes one or more of an automobile, a truck, a delivery vehicle, a plane, or a train.

9. A method for generating vehicle event records for a fleet of vehicles, wherein the fleet of vehicles includes a first vehicle and a second vehicle, the method comprising:
receiving, by a centralized cloud server that is geographically separated from the first vehicle and the second vehicle, and over a network during a first transmission, vehicle event information from a control unit mounted to the first vehicle, the control unit configured to (i) receive vehicle operation information via output signals generated by sensors coupled with the first vehicle and (ii) detect vehicle events based on the output signals, the vehicle event information including vehicle operation information and first time information that correspond to the detected vehicle events, wherein the detected vehicle events including a first vehicle event, wherein the vehicle event information for the first vehicle event is associated with the first time information;
receiving, over the network during a second transmission, video information corresponding to the first vehicle event from a video system, the second transmission being separate from the first transmission, wherein the video information includes different information than the vehicle event information, the video system including a video camera, the video system being mounted to the first vehicle and being physically separate and distinct from the control unit, the video information being transmitted from the vehicle separately from the vehicle event information, wherein the video information has been captured during periods of time for the detected vehicle events, the periods of time including a first period of time for the first vehicle event, the video information including second time information and consecutive frames of visual information representing an environment about the first vehicle, wherein the video information for the first vehicle event is associated with the second time information;
receiving, over the network during a third transmission, second vehicle event information from a second control unit mounted to the second vehicle, the second vehicle event information including vehicle operation information and third time information that correspond to detected vehicle events of the second vehicle, wherein the detected vehicle events including a second vehicle event, wherein the second vehicle event information for the second vehicle event is associated with the third time information;
receiving, over the network during a fourth transmission, second video information corresponding to the second vehicle event, the fourth transmission being separate from the third transmission, wherein the second video information includes different information than the second vehicle event information, the second video information including fourth time information and consecutive frames of visual information representing an environment about the second vehicle, wherein the second video information for the second vehicle event is associated with the fourth time information;
analyzing the vehicle event information received during the first transmission to identify information indicative of a physical event conveyed by the output signals, wherein the physical event occurred in the first period of time;
analyzing the video information received during the second transmission to identify information indicative of the same physical event;
correlating, by one or more physical computer processors located remotely from the first vehicle, the vehicle event information received during the first transmission with the video information received during the second transmission based on the analysis of both the vehicle event information and the video information such that the correlating is performed at a location of the centralized cloud server that is remote from the first vehicle, wherein correlating the vehicle event information with the video information includes correlating the first time information and the second time information;
analyzing the second vehicle event information received during the third transmission to identify information indicative of a second physical event;
analyzing the second video information received during the fourth transmission to identify information indicative of the same second physical event;
correlate, by the one or more physical computer processors, the second vehicle event information received during the third transmission with the second video information received during the fourth transmission based on the analysis of both the second vehicle event information and the second video information such that the correlating is performed at the location of the centralized cloud server that is remote from the second vehicle, wherein correlating the second vehicle event information with the second video information includes correlating the third time information and the fourth time information;
generating a first event record that includes or identifies (i) the video information that corresponds to the first vehicle event and (ii) the vehicle event information for the first vehicle event; and
generating a second event record that includes or identifies (i) the second video information that corresponds to the second vehicle event and (ii) the second vehicle event information for the second vehicle event.

10. The method of claim 9, wherein correlating the vehicle event information with the video information includes identifying and correlating:
information indicative of the physical event conveyed by the output signals included in the vehicle event information for the first vehicle event and information indicative of the same physical event conveyed by the video information captured during the first period of time.

11. The method of claim 9, wherein the control unit is configured such that:
the detected vehicle events have individual start times and individual end times, and
the vehicle event information includes vehicle operation information for periods of time that last from before the individual start times until after the individual end times; and
wherein the video system is configured such that the video information includes video information for periods of time that last from before the individual start times until after the individual end times.

12. The method of claim 9, wherein the video system is included in one or more external vehicle systems that generate information about the first vehicle.

13. The method of claim 9, wherein the video camera is an aftermarket camera.

14. The method of claim 9, further comprising:
responsive to receiving the vehicle event information, send a message from the to the centralized cloud server to the video system, wherein the message requests that the video system transmits the video information to the centralized cloud server, wherein the video information corresponds to the first vehicle event.

15. The method of claim 14, wherein the video information is received over the network responsive to the message.

16. The method of claim 9, wherein the first vehicle includes one or more of an automobile, a truck, a delivery vehicle, a plane, or a train.

\* \* \* \* \*